(12) United States Patent
Ford et al.

(10) Patent No.: US 12,337,238 B2
(45) Date of Patent: Jun. 24, 2025

(54) INTERNET OF THINGS BASED VIDEO GAME PLAY

(71) Applicant: Activision Publishing, Inc., Santa Monica, CA (US)

(72) Inventors: Robert Frederick Ford, Novato, CA (US); Paul Reiche, III, Novato, CA (US)

(73) Assignee: Activision Publishing, Inc., Santa Monica, CA (US)

( * ) Notice: Subject to any disclaimer, the term of this patent is extended or adjusted under 35 U.S.C. 154(b) by 0 days.

(21) Appl. No.: 18/484,369

(22) Filed: Oct. 10, 2023

(65) Prior Publication Data

US 2024/0181346 A1 Jun. 6, 2024

Related U.S. Application Data

(63) Continuation of application No. 17/023,755, filed on Sep. 17, 2020, now abandoned.

(60) Provisional application No. 62/903,435, filed on Sep. 20, 2019.

(51) Int. Cl.
| | | |
|---|---|---|
| A63F 13/56 | (2014.01) | |
| A63F 13/35 | (2014.01) | |
| A63F 13/87 | (2014.01) | |

(52) U.S. Cl.
CPC ............ *A63F 13/56* (2014.09); *A63F 13/35* (2014.09); *A63F 13/87* (2014.09); *A63F 2300/205* (2013.01); *A63F 2300/407* (2013.01)

(58) Field of Classification Search
CPC .......... A63F 13/56; A63F 13/87; A63F 13/35; A63F 13/822; A63F 13/216; A63F 13/352; A63F 2300/407; A63F 2300/205
USPC ........................................................... 463/42
See application file for complete search history.

(56) References Cited

U.S. PATENT DOCUMENTS

| | | | |
|---|---|---|---|
| 9,332,043 B1* | 5/2016 | Caldarone | H04L 51/043 |
| 10,362,057 B1* | 7/2019 | Wu | H04L 63/1408 |
| 2014/0141889 A1* | 5/2014 | Chowdhary | A63F 13/216 |
| | | | 463/42 |
| 2017/0061704 A1* | 3/2017 | Gewicke | H04L 67/131 |
| 2017/0315769 A1* | 11/2017 | Penke | G06F 3/0412 |
| 2017/0364698 A1* | 12/2017 | Goldfarb | H04L 9/3239 |
| 2018/0205552 A1* | 7/2018 | Struttmann | G06F 21/602 |
| 2019/0043281 A1* | 2/2019 | Aman | G07C 9/215 |
| 2019/0272675 A1* | 9/2019 | Wagner | H04N 23/57 |
| 2019/0311341 A1* | 10/2019 | Rice | G06F 3/011 |
| 2019/0346988 A1* | 11/2019 | Sullivan | G06F 3/0481 |
| 2020/0258099 A1* | 8/2020 | Alghamdi | G06Q 30/0261 |
| 2020/0294313 A1* | 9/2020 | Arroyo Palacios | A63F 13/25 |

(Continued)

*Primary Examiner* — Michael A Cuff
(74) *Attorney, Agent, or Firm* — RAY QUINNEY & NEBEKER P.C.; John O. Carpenter

(57) ABSTRACT

A virtual game world may have game locations based on electronic devices with communications capabilities. In some embodiments electronic devices with communications capabilities are identified to a server, which forms a game location for the identified devices, or at least some of them. The game locations may have non-player controlled game characters as inhabitants of the game locations. One or more characteristics of the inhabitants of a game location may be based on an aspect relating to the electronic device with communication capability with which the game location is associated.

13 Claims, 9 Drawing Sheets

(56) References Cited

U.S. PATENT DOCUMENTS

2022/0076532 A1* 3/2022 Weaver .............. G07F 17/3213

* cited by examiner

INTERNET OF THINGS BASED VIDEO GAME PLAY

CROSS REFERENCE TO RELATED APPLICATION

This application is a continuation application of U.S. patent application Ser. No. 17/023,755 filed on Sep. 17, 2020, which claims the benefit of the filing date of U.S. Provisional Patent Application No. 62/903,435, filed on Sep. 20, 2019, the disclosures of which are incorporated by reference herein.

BACKGROUND OF THE INVENTION

The present invention relates generally to video games, and more particularly to a network device-based world for video games.

Video games provide fun and enjoyment for many. Video games allow game players to participate in a variety of simulated activities. Video games allow game players to perform roles and experience activities that the game players may not be able or desire to experience directly, whether due to cost, danger, or equipment concerns, or simply due to a role or activity being fantastical.

Video game play may take place in a world of game play. The world of game play may be an entirely virtual world or include some real-world location components.

For some video games the world of game play may be pre-specified by game developers. For example, the game developers may painstakingly specify every detail of the world of game play, including the landscape, structures, objects, and non-player controlled characters that may be found in that world. This level of specificity, however, may be daunting to provide, particularly for game play worlds that may be extensive.

Some video games may make use of game play worlds that are procedurally generated. For example, the game play worlds may have a variety of pre-specified constructs, or general forms of pre-specified constructs, with combinations of the constructs and/or their details procedurally generated based on pseudo-random numbers, for example. Procedurally generated game play worlds may be unsatisfying for a variety of reasons, however, for example as being too random or being too divorced from reality.

Some video games may make use of game play worlds that are specified by those who actually engage in game play. Such user generated content may effectively provide for large numbers of game world "developers," who in theory at least could have insight as to desirable features of games worlds. Unfortunately, quality of such generated game worlds may vary.

BRIEF SUMMARY OF THE INVENTION

In some embodiments game world locations are based on devices with electronic communication capabilities. In some embodiments the electronic communication capabilities are one, some, or all of WiFi, Bluetooth, NFC, and/or RFID communication capabilities. In some embodiments the devices are devices connected, directly or indirectly, to a network. In some embodiments the network is the Internet. In some embodiments the devices are devices of the Internet-of-Things (IOT). In some embodiments non-player controlled game characters are associated with each of the game world locations. In some embodiments the non-player controlled game characters have characteristics with a relationship to a type of device on which a game world location is based. In some embodiments the non-player controlled game characters have characteristics with a relationship to a type of location at which the device is located in the real world.

Some embodiments provide a method of providing for video game play, comprising: for a plurality of electronic devices with communication capabilities, associating each of the electronic devices with communication capabilities with a corresponding one of a plurality of game locations; determining at least some characteristics of non-player controlled game characters associated with each game location based on information relating to the electronic device with communication capability associated with the game location; receiving a selection of a particular game location; and providing information of the non-player controlled game characters associated with the game location to a game device, for use in providing game play, on the game device, including interactions with the non-player controlled game characters.

Some embodiments provide a non-transitory computer readable memory storing program instructions, the program instructions comprising program instructions to configure at least one processor to: associate an identified electronic device with communication capability with a game location in a virtual game world; determine at least one characteristic for inhabitants of the game location, based on information relating to the identified electronic device; allocate inhabitants to the game location; receive a request from a game device for game play involving the game location; and transmit information regarding the inhabitants of the game location to a game device.

These and other aspects of the invention are more fully comprehended upon review of this disclosure.

DETAILED DESCRIPTION

Figure 1:
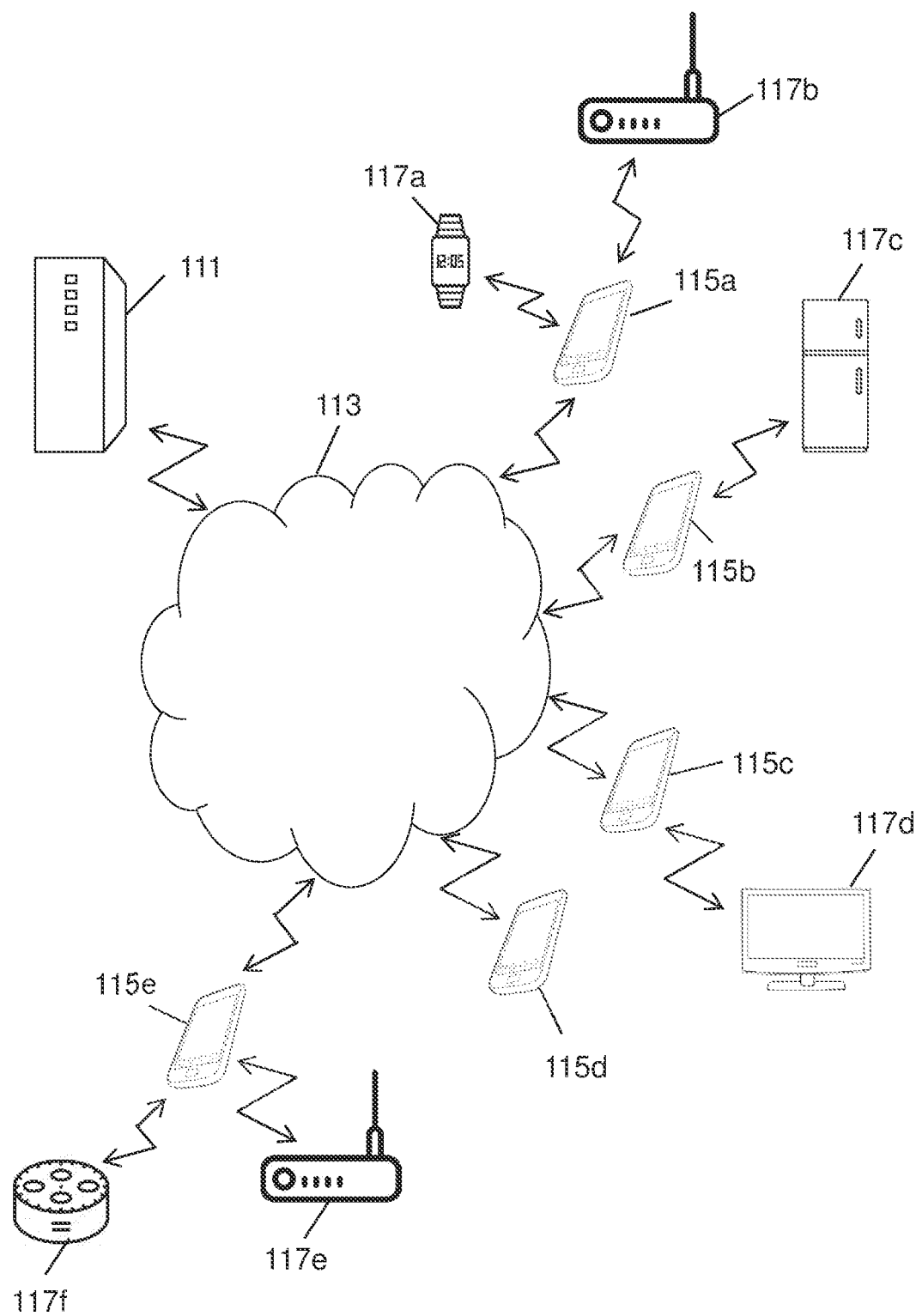
FIG. 1 is a networked system in accordance with aspects of the invention.

FIG. 1 is a networked system in accordance with aspects of the invention. In FIG. 1 a server is in communication with a plurality of game device 115*a-e* over a network. The server is shown in FIG. 1 as a stand-alone server. In various embodiments, however, functions of the server may instead be performed by a game device or game devices. Some of the game devices are, in turn, in communication with a variety of electronic devices with communication capabilities 117a-e. In some embodiments the electronic devices with communications capabilities, or some of them, are devices in an Internet-of-Things (IOT). In many embodiments, the system may include many, many more game devices and many, many more electronic devices with communications capabilities. In addition, as the phrase electronic devices with communications capabilities is somewhat unwieldy, for convenience the electronic devices with communications capabilities may be subsequently referred to herein as IOT devices. It should be recognized, however, that specific electronic devices with communications capabilities may themselves not be Internet-of-Things devices, and not all embodiments may include Internet-of-Things devices.

As examples, in FIG. 1 game device 115a is in communication with a fitness watch 117a, for example using Bluetooth communications, and a first network router 117b, for example using WiFi communications. Similarly, game device 115b is in communication with a smart refrigerator, game device 115c is in communication with a television, and game device 115e is in communication with a second network router 117e and a smart speaker for a virtual assistant. The game devices generally include at least one processor, a display, input devices, and communication capabilities, wireless communications capabilities in many embodiments. The game devices are shown in FIG. 1 as smartphones. In various embodiments the game devices may comprise tablet computers, and in some embodiments the game devices may comprise laptop computers, personal computers, and/or game consoles (generally with associated game controllers and display devices).

The game devices are configured for play of a video game. In some embodiments the video game is a single player video, in some embodiments the video game is a multi-player video game. During play of the video game, a game player utilizes input devices of a game device to interact with non-player controlled game characters, and in some embodiments to control one or more game characters associated with the game player. In some embodiments, during game play, the game player may interact with non-player controlled game characters, with for example the game player using inputs to the game device to provide messages to or commands with respect to the non-player controlled game characters, and the display and/or audio output devices of the game device indicating activities of the non-player controlled game characters. In some embodiments, during game play, the game character controlled by the game player may, responsive to commands inputs to the game device, may be in and interact with a virtual world and its other inhabitants, some of whom may be game characters controlled by other game players and some of whom may be non-player controlled game characters.

In some embodiments the game devices detect the IOT devices and provide information regarding the IOT devices to the server. In some embodiments the game devices provide one, some, or all of an IOT device type, an IOT device GPS location, and/or a type of locality of the IOT device. In some embodiments the device GPS location may be in the form of a GPS location of the game device detecting the IOT device, with the locations of the two devices assumed, for purposes of the game, to be the same at a time of detection of the device. In some embodiments the type of locality of the IOT device is a type of location of the IOT device, for example a residential or commercial location, a type of commercial location (e.g. coffee house, grocery store, etc.), or a particular brand of store.

In some embodiments the server receives information from the game devices regarding the IOT devices and creates locations in the game world based on IOT device related information. In some embodiments the locations in the game world are populated with inhabitants, which are non-player controlled game characters, as determined by the server. In some embodiments the server provides information regarding locations in the game world to the game devices. In some embodiments the server provides information regarding inhabitants of a particular location in the game world to a game device, in some embodiments in response to receiving a request from a game device. In some embodiments the request from the game device specifies the particular game world location.

In some embodiments the server provides the game devices information regarding activities or characteristics of the game location inhabitants. In some embodiments the game devices are configured to determine activities or characteristics of the game location inhabitants. In some embodiments the server receives information regarding game play status from the game devices, with the game server distributing the game play status to various game devices. In some embodiments the game server may instead receive requests for game character actions or characteristics from the game devices, with the game server determining game play status and distributing information regarding game play status to the game devices.

Figure 2A:
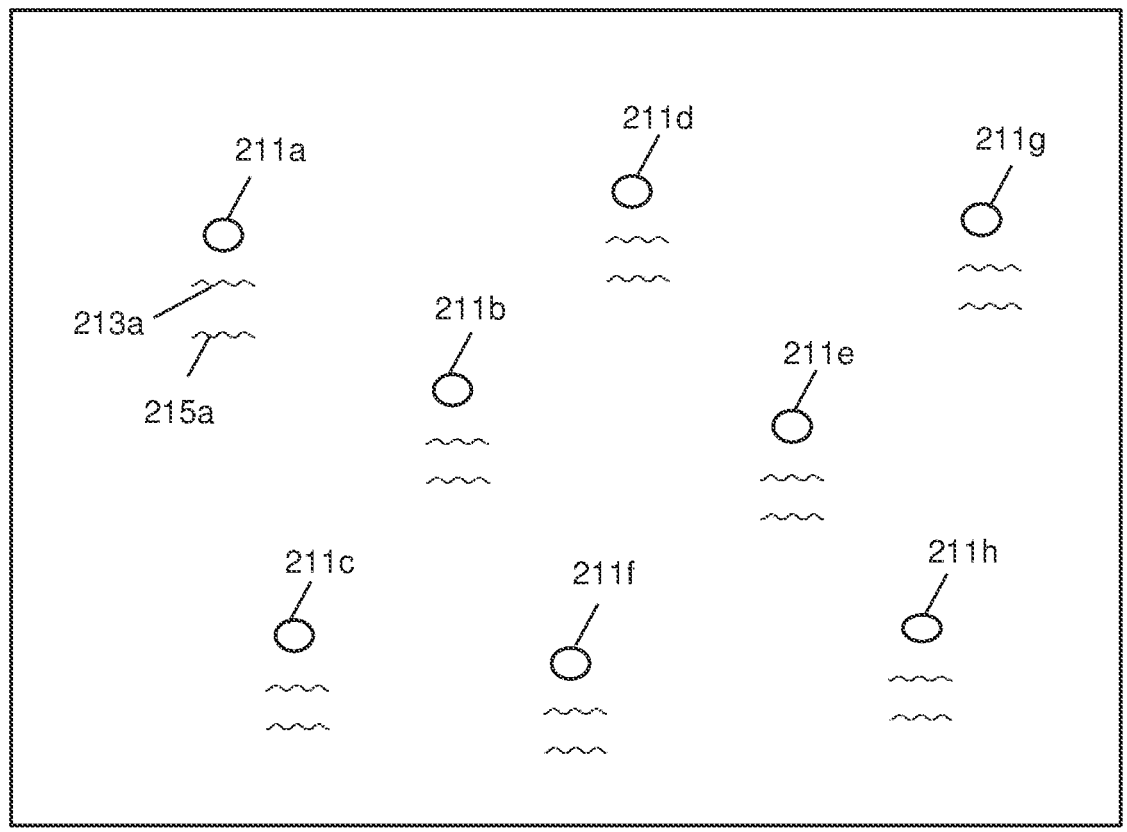
FIG. 2A is a map of game locations associated with IOT devices in accordance with aspects of the invention.

FIG. 2A is a map of a game world having game locations associated with IOT devices in accordance with aspects of the invention. In some embodiments the IOT devices are IOT devices that have been identified to a server, for example as later discussed with respect to FIG. 5 or elsewhere herein. The map indicates eight game locations 211a-h in the game world. In various embodiments there may be different numbers of game locations in the game world, and in some embodiments there may be many, many more game locations in the game world. In some embodiments there may be thousands of game locations in the game world. In various embodiments the map may only indicate some of the locations in the game world. In various embodiments game locations may be indicated in ways other than through use of a map, for example in some embodiments tables, listings, or other displays may be used instead or in addition to use of a map.

In the map of FIG. 2A, each game location has an associated label. For example, game location 211a has an associated label 213a underneath the game location 211a. The associated label may provide information regarding the game location. For example in some embodiments the associated label may indicate a type of IOT device with which the game location is associated. Also for example, in some embodiments the associated label may indicate an owner of an IOT device with which the game location is associated, or a number of game world inhabitants associated with the game location, a type of game world inhabitants associated with the game location, or some other information regarding the game location.

In some embodiments the game locations may correspond to a game location for a particular video game. For example, in some embodiments a video game may include a plurality of discrete game levels, game areas, or other virtual areas in which the game may be played. In such embodiments, those game levels, game areas, or other virtual areas may be each associated with a corresponding IOT device. With such an association, the associated label may indicate a name of the game area for the particular video game, or other information, for example the name of the particular video game.

In some embodiments, and as illustrated in FIG. 2A, each game location has a further associated label. For example, game location 211a has a further associated label 215a underneath the associated label 213a. In some embodiments the further associated label indicates a geographic location of an IOT device with which the game location is associated. For example, in some embodiments the indication of the geographic location may be the name of a city, a name of a neighborhood, or a GPS location. In some embodiments, however, the further associated label may indicate information as discussed with respect to the associated label.

Information of the map, or some of it, may, for example, be transmitted from a server to a game device. In some embodiments the map of game locations may be displayed on a display of a game device, and a game player using the device may select a particular one of the game locations, which may be any of the game locations in some embodiments. In some embodiments the particular one of the game locations may be selected through use of a touchscreen input device of the game device, but in various embodiments other input mechanisms or procedures may be used for selection of the particular one of the game locations. Further, in various embodiments, game locations may instead be presented on the game device display as a list, in a table, or in some other format, with the particular one of the game locations selected from the list, table, or other format. In some embodiments game locations in the game world may be searched or filtered by a game player based on such information regarding the game location.

Once the particular one of the game locations is selected, the game device may present an activity of an inhabitant or multiple inhabitants of the game location. In some embodiments the presentation is by way of a display device of the game device, and in some embodiments the presentation is instead or in addition by way of an audio output device of the game device. In some embodiments the activity of the inhabitant is a message. In some embodiments the message is presented in text on a display device of the game device. In some embodiments the message is presented audibly by an audio output of the game device. In some embodiments a visual representation of the inhabitant is also displayed on the display device of the game device.

In some embodiments the game player may interact with the inhabitant or multiple inhabitants by way of responding to the message. In some embodiments the game device determines a responsive message to the inhabitant by receipt of one or more inputs to the game device provided by the game player. In some embodiments the responsive message is selected from a plurality of potential responsive messages. In some embodiments the responsive message is a message, for example a text message, entered using an input device of the game device.

In various embodiments the inhabitant, or multiple inhabitants, may respond to the responsive message, the game player may provide, by way of the input device of the game device, further responsive messages, and so on.

In some embodiments, game player interaction may comprise other interactions with the inhabitants. For example, in some embodiments the game player may control, using the game device inputs, a game character that virtually interacts with the inhabitants, the game player may provide to or remove from the inhabitants some resource or objects (e.g., food, water, money, building supplies, weapons, vehicles, etc.), or the game player may take some other game play action with respect to the inhabitants.

Figure 2B:
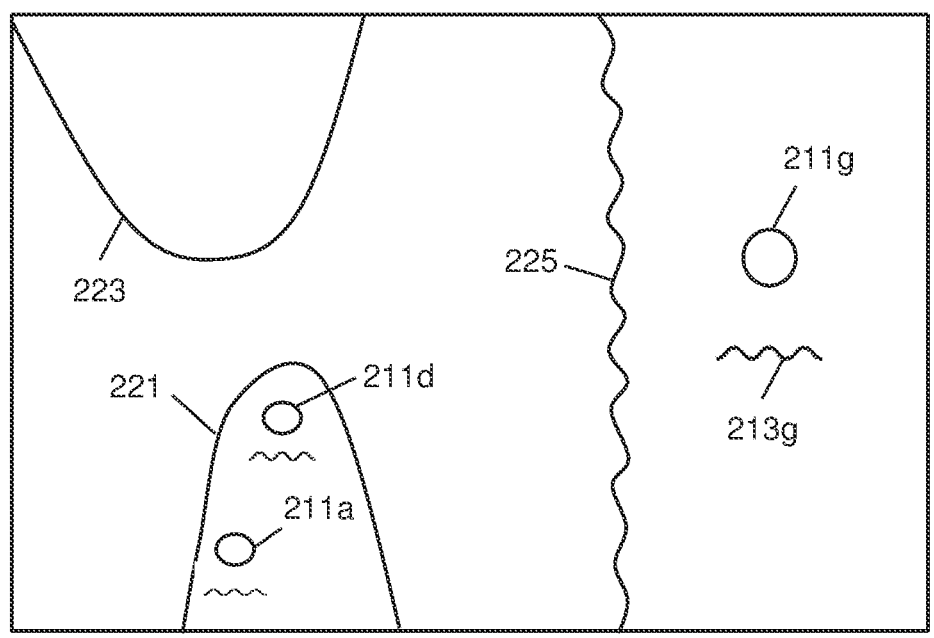
FIG. 2B is a further map of game locations associated with IOT devices in accordance with aspects of the invention.

In some embodiments, for example embodiments in which the game location is a game location in another video game, selection of the particular one of the game locations may serve as a gateway to entering into gameplay of the other video game. In such embodiments, the server may provide game play information for play of the other video game, for the game location in the other video game. FIG. 2B is a further map of a game world having game locations associated with IOT devices in accordance with aspects of the invention. The map of FIG. 2B differs from the map of FIG. 2A in that real world locations are shown, with IOT device locations in the real world indicated. In some embodiments the IOT device locations are shown with specificity. In other embodiments the IOT device locations may be shown more generally, for example simply within a particular city or particular neighborhood, without disclosing an exact location of the IOT devices.

FIG. 2B generally shows physical features of a part of the real world of the San Francisco bay area, including portions of the San Francisco peninsula 221, portions of Marin County 223 and portions of the East Bay 225. The game world location 211a is shown as located south of the city of San Francisco, the game world location 211d is shown as located in the city of San Francisco, and the game world location 211g is shown as in the East Bay, for example roughly as the location of the Berkeley campus of the University of California. Each of the game locations corresponds, at least generally, to a location of an IOT device with which the game location may be associated. Each of the game locations also has the associated label, with for example game location 211g having an associated label 213g.

Game players may interact with game inhabitants associated with each game location, for example as discussed with respect to FIG. 2A and elsewhere herein. In some embodiments, however, interactions with game inhabitants associated with a particular game location may only be available to a game player if a game device associated with the player is within a predetermined distance of the particular game location, or within a predetermined region of the game location. For example, in some embodiments interactions with game inhabitants of game location 211d, in the city of San Francisco, may only be available if the game device is located within the city of San Francisco, for example as indicated by GPS related circuitry of the game device.

In some embodiments geo-locating a game location in the real world, for example as illustrated in FIG. 2B, may provide for other or additional aspects of game play. Such aspects may extend beyond merely restricting availability of game play based on game device location. For example, in some embodiments, inhabitants may be moved from one game location to another game location, for example based on movement of a game device from the one game location to the other game location. Such embodiments may also make use of communicative interactions between game players, by way of their game devices, and game location inhabitants, for example communications from game location inhabitants requesting moves to other game locations. For example, the game may provide a communication to a game device from an inhabitant of the game location 211d, in the city of San Francisco, with the communication being a request to be moved to game location 221g, in the University of California campus. In addition, movement of game location inhabitants may form part of play of a strategy based game. In addition, instead of moving game location inhabitants, game play may also involve movement of other in-game items such as resource or objects (e.g., food, water, money, building supplies, weapons, vehicles, etc.). In some embodiments, inhabitants at various game locations may request or supply certain types of in-game items and the game player may move those in-game items from the supplier to the requester. In some embodiments, such movement of inhabitants or in-game items may result in an in-game benefit for the game player (e.g., more points, resources, currency, lives, etc.).

In some embodiments, game players may participate in loyalty or rewards programs tied to the aspects of the game locations and earn loyalty or rewards points for interacting with or being in proximity to those aspects of the game locations. For example, game players may be a part of loyalty or rewards programs for various products or services such as beverage or food brands, clothing stores or brands, fitness trackers, electronics brands, or any other type of product or service. Game locations may be associated with one or more of these products or services, and when a game player is at the game location, the game player may earn a predefined amount of rewards. For example, a game player may earn rewards for a coffee store when the player is at the coffee shop, or a game player may earn rewards for a fitness tracker when the game player is at any location known to be gym. In some embodiments, the points or rewards earned in the game may also be used to purchase real-world goods and services at these locations.

Figure 3:
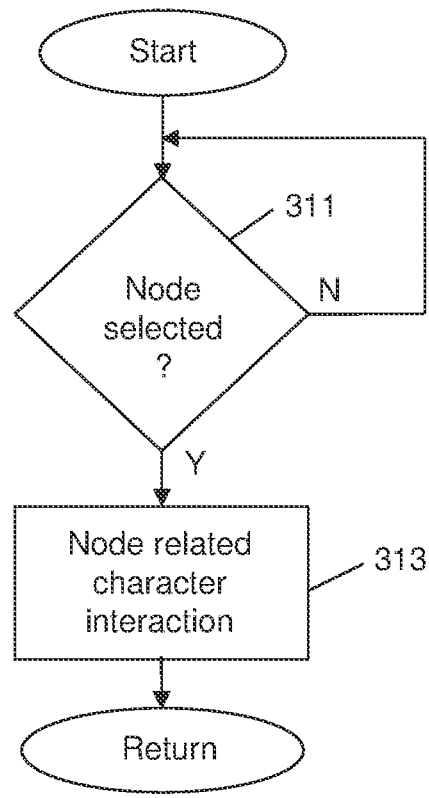
FIG. 3 is a flow diagram of a process for providing for game play in accordance with aspects of the invention.

FIG. 3 is a flow diagram of a process for providing for game play in accordance with aspects of the invention. In some embodiments the process is performed by a game device. In some embodiments the game device is a smart phone. In some embodiments the process is performed, at least in part, by a server. In some embodiments the process is performed by a server and a game device. In some embodiments the process, or parts of the process, is performed by at least one processor, for example a processor executing program instructions. The program instructions may be stored in non-transitory computer readable media available to the processor. In some embodiments the process is performed by a system, for example the system of FIG. 1. In some embodiments the process is performed by a part or parts of a system, for example a part or parts of the system of FIG. 1.

In block 311 the process determines if a game location has been selected. In some embodiments a game location is a virtual location associated with an IOT device. In some embodiments the IOT device is a node on a network, and selection of the game location may be considered selection of an IOT node for gameplay. In some embodiments the process determines if an input to a game device indicates a request for selection of a game location. In some embodiments the request is for selection of a particular game location of a plurality of game locations. In some embodiments the process determines that a game location has been selected if the input to the game device indicates a request for selection of the game location. In some embodiments the process determines that a game location has been selected if the input to the game device indicates a request for selection of the game location and the game device itself is located within a predetermined real world region, for example a region associated with a real world location of the IOT device. In some embodiments whether the game device is located within the predetermined real world region is determined using GPS location information of the game device, for example as indicated by GPS related circuitry of the game device.

Responsive to the game location being selected, the process proceeds to block 313.

In block 313 the process provides for interactions with non-player controlled game characters associated with the game location. In some embodiments the non-player controlled game characters associated with the game location may be considered inhabitants of the game location. In some embodiments the interactions with the inhabitants comprise communications with the inhabitants. In some embodiments the interactions with the inhabitants comprise a transportation action with respect to at least one of the inhabitants. In some embodiments the interactions with the inhabitants comprise a game strategy action involving the inhabitants. In some embodiments the interactions comprise providing or removing an in-game item from the inhabitants. In some embodiments the interactions with the inhabitants comprise game play including game player control of a game character battling the inhabitants, or at least one inhabitant.

In some embodiments the process may instead or in addition provide other items responsive to the game location being selected. For example, in some embodiments selection of a game location may result in the process making available for control by a game player a virtual game character in another game.

The process thereafter returns.

Figure 4A:
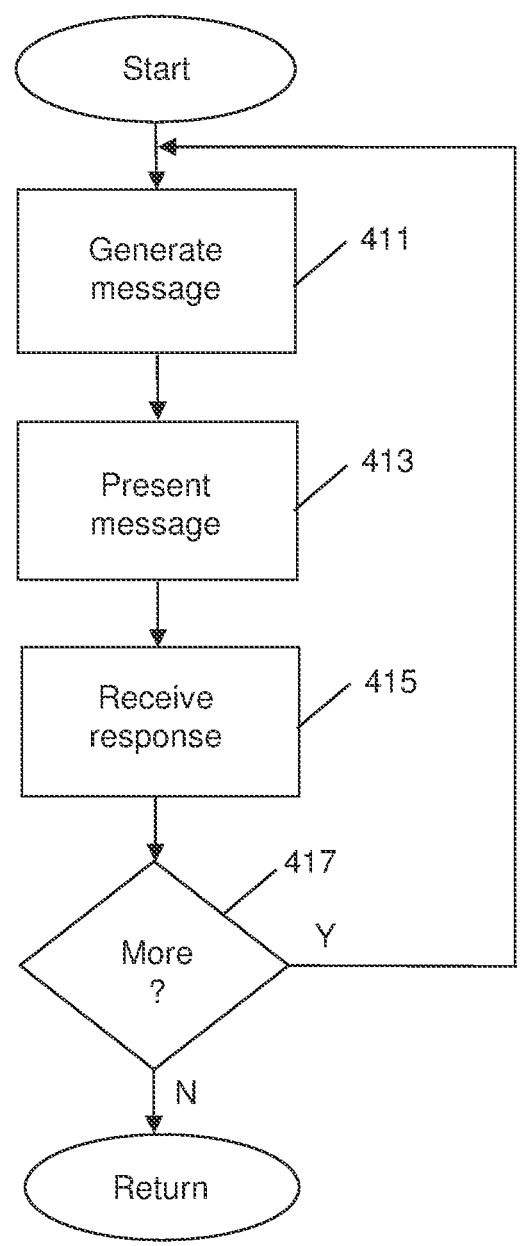
FIG. 4A is a flow diagram of a process for providing non-player controlled communication interactions in accordance with aspects of the invention.

FIG. 4A is a flow diagram of a process for providing non-player controlled communication interactions in accordance with aspects of the invention. In some embodiments the process of FIG. 4A performs operations of block 313 of the process of FIG. 3. In some embodiments the process is performed by a game device. In some embodiments the game device is a smart phone. In some embodiments the process is performed, at least in part, by a server. In some embodiments the process is performed by a server and a game device. In some embodiments the process, or parts of the process, is performed by at least one processor, for example a processor executing program instructions. The program instructions may be stored in non-transitory computer readable media available to the processor. In some embodiments the process is performed by a system, for example the system of FIG. 1. In some embodiments the process is performed by a part or parts of a system, for example a part or parts of the system of FIG. 1.

In block 411 the process generates a message. The message is indicated as being from one or more inhabitants of a game location or from the game itself (e.g., an in-game narrator or guide). In some embodiments the game location is a game location selected by a game device. In some embodiments the message is generated by the game device, for example in accordance with program instructions for game play. In some embodiments the message is generated by a server, and transmitted to the game device. In some embodiments the message represents a message from one or more inhabitants of a game location to a game player.

In some embodiments the message is based, at least in part, on a characteristic of inhabitants of the game location or the game location itself. In various embodiments the characteristic, in turn, is based on information relating to an IOT device associated with the game location. For example, the game location may be associated with an IOT device in the form of a fitness watch, and the characteristic of the inhabitants may relate to physical fitness. Also for example, the game location may be associated with an IOT device located in a coffee shop, and the characteristic of the inhabitants may relate to a perceived energy level of the inhabitants.

In block 412 the process presents the message using a game device. In some embodiments the game device displays the message on a display device of the game device. In some embodiments the game device instead, or in addition, provides an audio representation of the message using an audio output of the game device.

In block 415 the process receives a further message in response to the message. In some embodiments the game device receives the further message. In some embodiments the game device receives the further message by way of an input device of the game device. In some embodiments the game player enters the further message using the input device of the game device.

In block 417 the process determines if an additional message should be generated. In some embodiments the determination of whether the additional message should be generated is based on information of the further message. In some embodiments the determination of whether the additional message should be generated is based on a state of game play.

If an additional message should be generated the process goes to block 411. Otherwise the process returns.

Figure 4B:
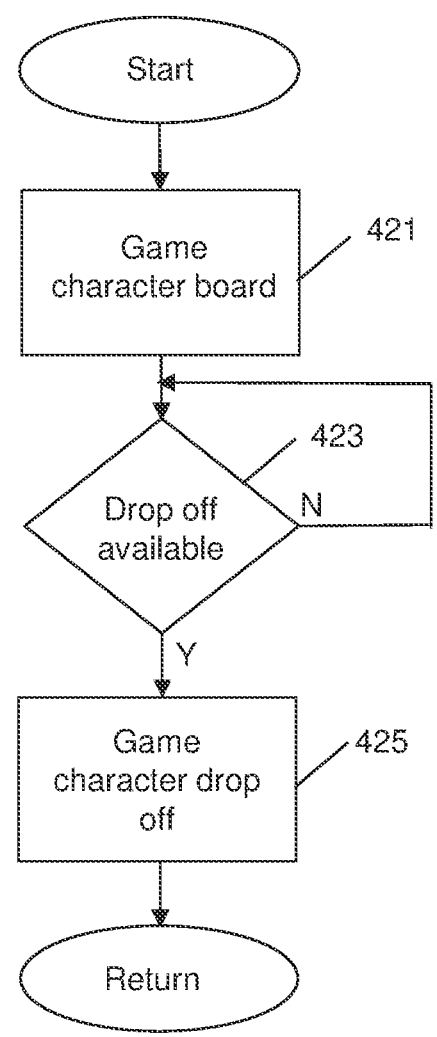
FIG. 4B is a flow diagram of a process for providing non-player controlled transportation interactions in accordance with aspects of the invention.

FIG. 4B is a flow diagram of a process for providing non-player controlled transportation interactions in accordance with aspects of the invention. In some embodiments the process of FIG. 4B performs operations of block 313 of the process of FIG. 3. In some embodiments the process is performed by a game device. In some embodiments the game device is a smart phone. In some embodiments the process is performed, at least in part, by a server. In some embodiments the process is performed by a server and a game device. In some embodiments the process, or parts of the process, is performed by at least one processor, for example a processor executing program instructions. The program instructions may be stored in non-transitory computer readable media available to the processor. In some embodiments the process is performed by a system, for example the system of FIG. 1. In some embodiments the process is performed by a part or parts of a system, for example a part or parts of the system of FIG. 1.

In block 421 the process virtually boards an inhabitant of or in-game items relating to a game location onto a game device. In some embodiments the process boards the inhabitant or item onto the game device in response to receiving a boarding selection made on the game device. In some embodiments the boarding selection is made using an input device of the game device. In some embodiments an option to make the boarding selection is presented on a display of the game device as part of generating a message from the inhabitant, item, or game, for example as discussed with respect to block 411 of the process of FIG. 4A. In some embodiments the option to make the boarding selection is presented on the display of the game device in response to receipt of a further message, for example as discussed with respect to block 415 of the process of FIG. 4A. In some embodiments the option to make the boarding selection is only presented if the game device is located within a predetermined region surrounding an IOT device associated with the game location.

In block 423 the process determines if the inhabitant or item boarded onto the game device may be dropped off at another game location. In some embodiments the process determines that the inhabitant or item may be dropped off if the game device has selected another game location which is indicated as being a game location at which the inhabitant or item may be dropped off. In some embodiments the game device stores in game device memory, for example as part of storing game play related information and/or program instructions, an indication that the game location is a game location at which the inhabitant or item may be dropped off. In some embodiments a server stores the indication that the game location is a game location at which the inhabitant or item may be dropped off, with the server communicating the indication to the game device. In some embodiments the process determines that the inhabitant or item may be dropped off if the game device indicates that the game device is located within a predetermined region surrounding an IOT device associated with the game location.

If the process determines that the inhabitant or item boarded onto the game device may be dropped off at the other game location, the process continues to block 425.

In block 425 the process drops off the boarded inhabitant or item at the other game location. In some embodiments the process drops off the boarded inhabitant or item in response to the game device receiving an indication of a drop off option. In some embodiments the dropped off inhabitant or item becomes an inhabitant or item at the other game location.

The process thereafter returns.

Figure 4C:
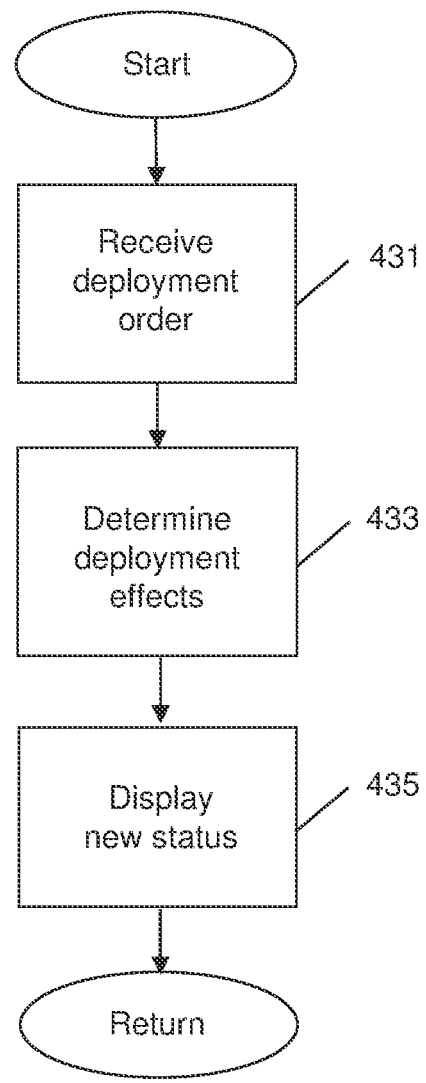
FIG. 4C is a flow diagram of a process for providing strategy game play in accordance with aspects of the invention.

FIG. 4C is a flow diagram of a process for providing strategy game play in accordance with aspects of the invention. In some embodiments the process of FIG. 4C performs operations of block 313 of the process of FIG. 3. In some embodiments the process is performed by a game device. In some embodiments the game device is a smart phone. In some embodiments the process is performed, at least in part, by a server. In some embodiments the process is performed by a server and a game device. In some embodiments the process, or parts of the process, is performed by at least one processor, for example a processor executing program instructions. The program instructions may be stored in non-transitory computer readable media available to the processor. In some embodiments the process is performed by a system, for example the system of FIG. 1. In some embodiments the process is performed by a part or parts of a system, for example a part or parts of the system of FIG. 1.

In block 431 the process receives a deployment order. In some embodiments the deployment is received by way of an input device of a game device. In some embodiments the deployment order is a request for inhabitants of a game location to take some action. In some embodiments the deployment order specifies the game location and the action to be taken by the inhabitants. In some embodiments the action to be taken is for the inhabitants to move to another game location. In some embodiments the action to be taken is some other action, for example an action to assume a defensive position, an action to develop resources, an action to move resources to or from another game location, or some further action.

In block 433 the process determines effect of the deployment. In some embodiments the effect of the deployment is to change a state of the game. In some embodiments the effect of the deployment is to change a state of a multiplayer game. In some embodiments the effect of the deployment is to change game play ownership, by a game player, of a game location. In some embodiments the effect of the deployment is to change an amount of resources available for use in game play by inhabitants of the game location.

In block 435 the process displays aspects of status of the game on the game device. In some embodiments the aspects of status of the game that are displayed are the aspects of status that have changed due to the effect of the deployment.

The process thereafter returns.

Figure 5:
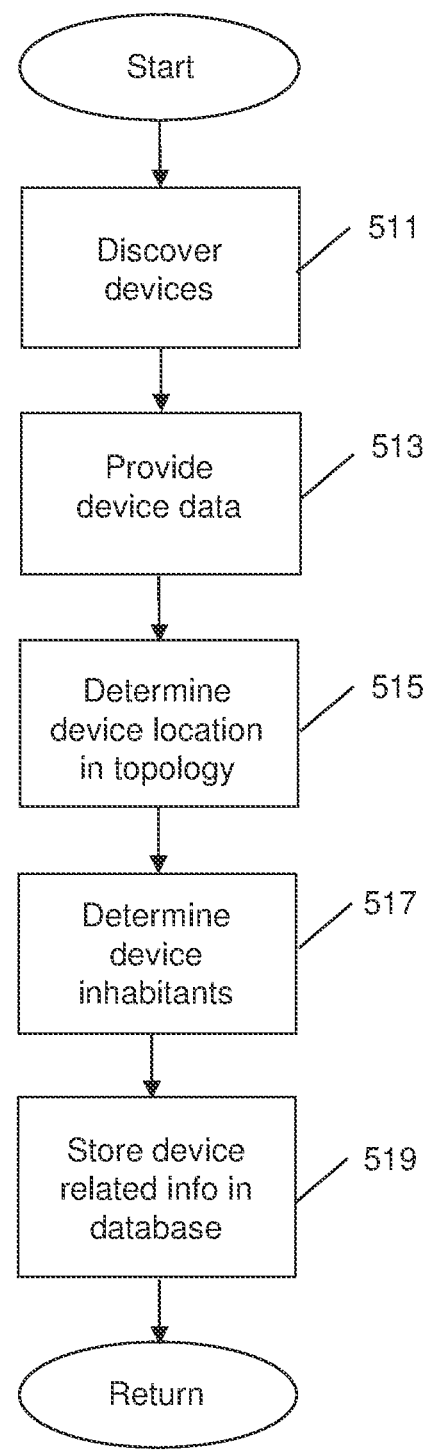
FIG. 5 is a flow diagram of a process for determining game world locations and inhabitants in accordance with aspects of the invention.

FIG. 5 is a flow diagram of a process for determining game world locations, inhabitants, and items in accordance with aspects of the invention. In some embodiments the process is performed by a game device. In some embodiments the game device is a smart phone. In some embodiments the smart phone is in communication with a local area network. In some embodiments the smart phone is in communication with devices on a local area network. In some embodiments the process is performed, at least in part, by a server. In some embodiments the process is performed by a server and a game device. In some embodiments the process, or parts of the process, is performed by at least one processor, for example a processor executing program instructions. The program instructions may be stored in non-transitory computer readable media available to the processor. In some embodiments the process is performed by a system, for example the system of FIG. 1. In some embodiments the process is performed by a part or parts of a system, for example a part or parts of the system of FIG. 1.

In block 511 the process discovers electronic devices with communication capabilities. In some embodiments the game device transmits requests for identification of electronic devices with communication capabilities directly to the electronic devices with communication capabilities. In some embodiments the game device transmits requests for identification of electronic devices with communication capabilities to a node on a local area network, for example a router. In some embodiments the game device requests device information from the electronic devices with communication capabilities, for example a type of device or other information regarding the device. In some embodiments device owners may provide an indication of existence of a device. In some embodiments the game device uses a software application configured to determine devices on a network, and identifying information regarding the devices, to discover devices.

In block 513 the process provides device information. In some embodiments the game device provides the device information to a server. In some embodiments device owners provide the device information to the server. In some embodiments the device information comprises a type of device. In some embodiments the device information comprises a locale of the device, for example a business with which the device is associated or a neighborhood in which the device is located. In some embodiments the device information comprises a geographic location of the device, for example a city or GPS location of the device. In some embodiments the device information may be generic information, for example if a type or locale of the device is unknown, or, in some embodiments, if the device is a secure device.

In block 515 the process determines a location of the devices in a game world topology. In some embodiments the game world topology is in a form of an ordered list. In some embodiments the game world topology is in a form of a tree. In some embodiments devices are placed in the ordered list or tree according to a predetermined criteria. In some embodiments the game world topology reflects a network topology of one or more networks in which the devices may be found. In some embodiments devices are pseudo-randomly distributed in the game world topology. In some embodiments the game world topology reflects real world locations of the devices. In some embodiments devices meeting predetermined criteria are excluded from the game world topology. For example, in some embodiments certain types of devices, or devices expected to perform certain functions, or secure devices are excluded from the game world topology.

In some embodiments the game world topology includes predefined game play areas, game levels, or other virtual areas in a game world, and in such embodiments the game world topology may be predefined. For such embodiments game devices may be associated with game world locations in the predefined topology, pseudo-randomly in some embodiments or based on some metric in other embodiments.

In block 517 the process determines inhabitants and items to populate game world locations associated with each device. In some embodiments the process determines one or more characteristics of the inhabitants or items for a game world location based on a type of device associated with the game world location. In some embodiments the process determines one or more characteristics of the inhabitants or items for a game world location based on a locale or location of the device associated with the game world location. In some embodiments the game world locations are predefined with respect to inhabitants or items, and the inhabitants or items are simply determined to be those inhabitants or items already in those game world locations.

In block 519 the process stores device related information in memory, for example in a form of a database. In some embodiments the device related information comprises identifiers of game world locations, their location in the game world topology, and information regarding inhabitants and items of the game world locations. In some embodiments the database is accessed to provide game play information to game devices taking part in a game.

The process thereafter returns.

Figure 6:
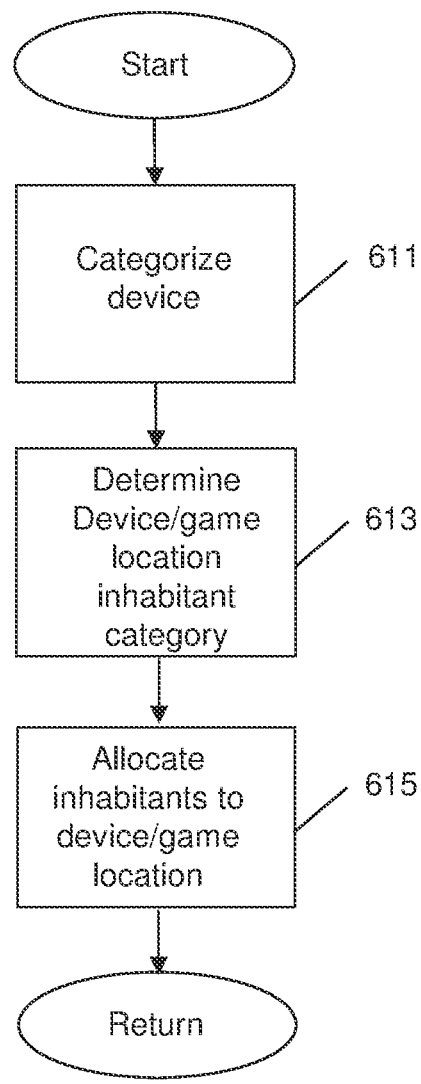
FIG. 6 is a flow diagram of a process for determining game world inhabitants associated with a game location in accordance with aspects of the invention.

FIG. 6 is a flow diagram of a process for determining game world inhabitants and items associated with a game location in accordance with aspects of the invention. In some embodiments the process of FIG. 6 performs operations of block 517 of the process of FIG. 5. In some embodiments the process is performed by a game device. In some embodiments the game device is a smart phone. In some embodiments the smart phone is in communication with a local area network. In some embodiments the smart phone is in communication with devices on a local area network. In some embodiments the process is performed, at least in part, by a server. In some embodiments the process is performed by a server and a game device. In some embodiments the process, or parts of the process, is performed by at least one processor, for example a processor executing program instructions. The program instructions may be stored in non-transitory computer readable media available to the processor. In some embodiments the process is performed by a system, for example the system of FIG. 1. In some embodiments the process is performed by a part or parts of a system, for example a part or parts of the system of FIG. 1.

In block 611 the process categorizes an IOT device. In some embodiments the IOT device is categorized by a type of device. For example, in some embodiments the IOT device is categorized as one of a fitness watch, a refrigerator, a router, a computer peripheral, or some other type of device. In some embodiments the IOT device is categorized based on information relating to a name of the device, a communication protocol to be used in communicating with the device, or other information regarding the device. In some embodiments the other information regarding the device may be a name of entity associated with the device, for example a name of a business, or an indication of a neighborhood or other location of the device. In some embodiments the information regarding the device is information provided by the device, in some embodiments the information regarding the device is information provided by another device, for example a computer or game device in communication with the device, and such information may be generated by the computer or game device, and not the IOT device itself.

In block 613 the process determines a category of inhabitants to be located at a game location associated with the device. In some embodiments the category is based on the category of the IOT device. In some embodiments categories of inhabitants are based on one or more characteristics of inhabitants. For example, in some embodiments inhabitants may be characterized based on one or more of health levels, energy levels, areas of expressed interest and/or knowledge, etc. As an example, the process may determine that the category of inhabitants for a game location associated with a fitness watch is inhabitants with high health levels. Also as an example, the process may determine that the category of inhabitants for a game location associated with a IOT device located at a coffee shop is inhabitants with high energy levels.

The process thereafter returns.

Although the invention has been discussed with respect to various embodiments, it should be recognized that the invention comprises the novel and non-obvious claims supported by this disclosure.

What is claimed is:

1. A method of providing for video game play, comprising:
   for a plurality of electronic devices with communication capabilities, associating, by a server, each of the electronic devices with communication capabilities with a corresponding one of a plurality of game locations in a virtual game world;
   obtaining device information relating to at least one real world property of each electronic device associated with each game location of the plurality of game locations;
   associating the device information with an associated game location;
   determining at least some characteristics of non-player controlled game characters associated with each game location based on the device information associated with the game location;
   receiving a selection of a particular game location of the plurality of game locations; and
   providing information, by the server, of the non-player controlled game characters associated with the particular game location to a game device, wherein the game device is not an electronic device of the plurality of electronic devices with communication capabilities, for use in providing game play, on the game device, including interactions with the non-player controlled game characters.

2. The method of claim 1, wherein the device information relating to at least one real world property relating to the electronic device with communication capability associated with the game location comprises information of a type of the electronic device with communication capability.

3. The method of claim 1, wherein the device information relating to at least one real world property relating to the electronic device with communication capability associated with the game location comprises information of a locale of the electronic devices with communication capability.

4. The method of claim 1, wherein the device information relating to at least one real world property relating to the electronic device with communication capability associated with the game location comprises information of a business associated with the electronic device with communication capability.

5. The method of claim 1, wherein the device information relating to at least one real world property relating to the electronic device with communication capability associated with the game location comprises information of a geographic location of the electronic device with communication capability.

6. The method of claim 1, wherein the device information relating to at least one real world property relating to the electronic devices with communication capability for at least some of the electronic devices with communication capability is provided to the server by the game device.

7. The method of claim 1, further comprising providing game play, on the game device, including interactions with the non-player controlled game characters, with the interactions with the non-player controlled game characters including presenting messages from the non-player controlled game characters by the game device.

8. The method of claim 1, further comprising providing game play, on the game device, including interactions with the non-player controlled game characters, with the interactions with the non-player controlled game characters including transporting at least some non-player controlled game characters from a first game location to a second game location.

9. The method of claim 1, wherein each game location is a virtual location.

10. The method of claim 1, wherein each game location corresponds to a location of the electronic device with communication capabilities with which the game location is associated.

11. The method of claim 1, wherein at least some of the electronic devices with communication capabilities comprise at least one a smart refrigerator, a television, and a smart speaker for a virtual assistant.

12. A non-transitory computer readable memory storing program instructions, the program instructions comprising program instructions to configure at least one processor to:
   associate an identified electronic device with communication capability with a game location in a virtual game world;
   obtain device information relating to at least one real world property of each electronic device associated with each game location of the plurality of game locations;
   associate the device information with an associated game location;
   determine at least one characteristic for inhabitants of the game location, based on the device information associated with the game location;
   allocate inhabitants to the game location;
   receive a request from a game device for game play involving the game location; and
   transmit information regarding the inhabitants of the game location to a game device;
   wherein the identified electronic device with communication capability is not a game device.

13. The non-transitory computer readable memory of claim 12, wherein the program instructions further comprise program instructions to:
   receive a request for available game locations; and
   provide available game locations to the game device.

* * * * *